United States Patent
Metz et al.

(10) Patent No.: US 9,540,990 B2
(45) Date of Patent: Jan. 10, 2017

(54) EXHAUST-GAS TURBOCHARGER

(71) Applicant: BorgWarner Inc., Auburn Hills, MI (US)

(72) Inventors: Dietmar Metz, Meckenheim (DE); Martin Mueller, Speyer (DE); Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 334 days.

(21) Appl. No.: 14/396,111

(22) PCT Filed: Apr. 19, 2013

(86) PCT No.: PCT/US2013/037307
§ 371 (c)(1),
(2) Date: Oct. 22, 2014

(87) PCT Pub. No.: WO2013/163018
PCT Pub. Date: Oct. 31, 2013

(65) Prior Publication Data
US 2015/0132112 A1    May 14, 2015

(30) Foreign Application Priority Data

Apr. 27, 2012    (DE) ........................ 10 2012 008 590

(51) Int. Cl.
| | |
|---|---|
| *F01D 17/16* | (2006.01) |
| *F02B 37/24* | (2006.01) |
| *F04D 19/02* | (2006.01) |
| *F04D 27/00* | (2006.01) |

(52) U.S. Cl.
CPC ............ *F02B 37/24* (2013.01); *F01D 17/165* (2013.01); *F04D 19/02* (2013.01); *F04D 27/002* (2013.01); *F05D 2220/40* (2013.01); *F05D 2250/90* (2013.01); *Y02T 10/144* (2013.01)

(58) Field of Classification Search
CPC ...... F01D 17/165; F05D 2250/90; F02B 37/24
See application file for complete search history.

(56) References Cited

U.S. PATENT DOCUMENTS

| | | | | |
|---|---|---|---|---|
| 7,886,536 | B2 * | 2/2011 | Hemer | F01D 17/165 415/159 |
| 8,262,346 | B2 * | 9/2012 | Wengert | F01D 17/165 415/163 |
| 8,376,696 | B2 * | 2/2013 | Suzuki | F01D 17/165 415/164 |
| 8,545,173 | B2 * | 10/2013 | Valin | F01D 17/165 415/164 |

* cited by examiner

*Primary Examiner* — Ninh H Nguyen
(74) *Attorney, Agent, or Firm* — A. Michael Tucker; Stephan A. Pendorf; Patent Central LLC

(57) ABSTRACT

A variable turbine geometry (VTG) exhaust-gas turbocharger in which guide vanes are adjusted by means of a unison ring, the structure of which has a simpler and thus more cost-effective design. The number of components is reduced, for example for rollers on pins as are provided in the case of known bearings. A very beneficial relationship between friction radius and rolling radius in the given installation space is obtained.

16 Claims, 2 Drawing Sheets

EXHAUST-GAS TURBOCHARGER

Figure 1:
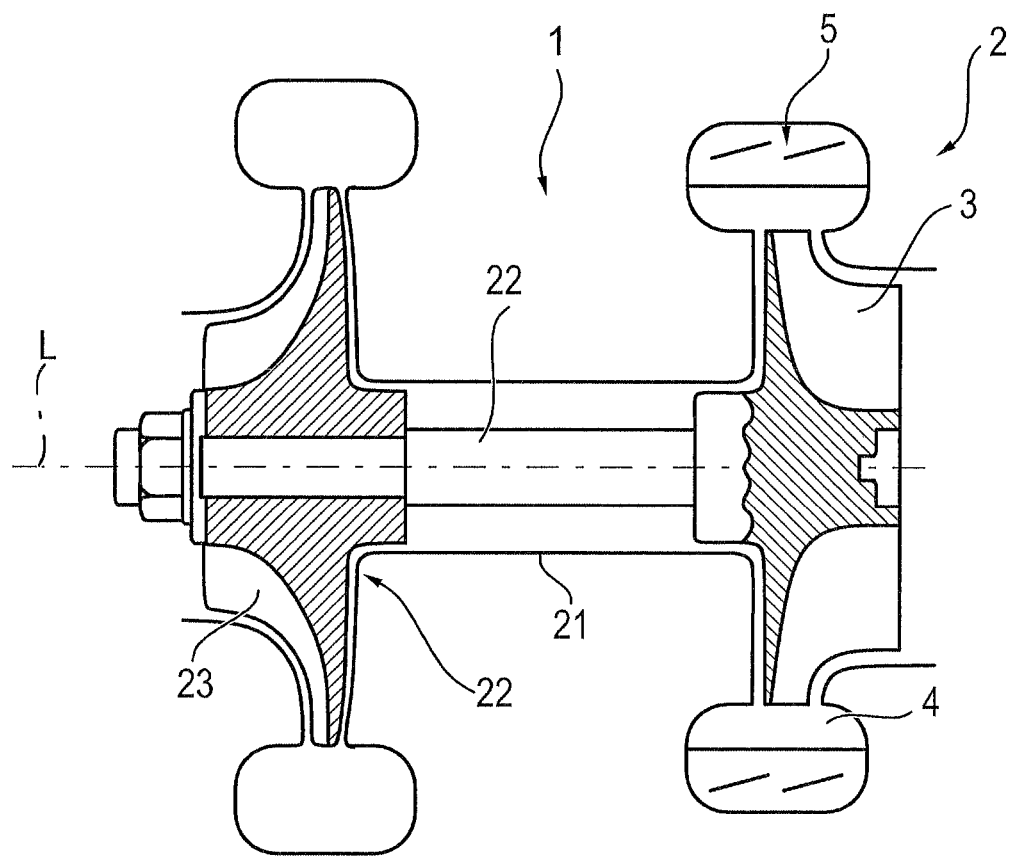

The invention relates to an exhaust-gas turbocharger according to the preamble of claim 1.

In the case of such an exhaust-gas turbocharger, provision is made of a variable turbine geometry (VTG), in which guide vanes are adjusted by means of a unison ring. In order to be able to provide the best possible control, the least possible hysteresis and thus the least possible friction of the system is desirable. The radial bearing of the unison ring also has an influence on this, for example. In the case of known exhaust-gas turbochargers, rollers on pins or else a rolling bearing are provided for this. In view of this, it is an object of the present invention to provide an exhaust-gas turbocharger of the type indicated in the preamble of claim 1, the structure of which has a simpler and thus more cost-effective design.

This object is achieved by the features of claim 1.

This advantageously gives rise firstly to a saving in the number of components, for example for rollers on pins as are provided in the case of known bearings.

A very beneficial relationship between friction radius and rolling radius in the given installation space is advantageously also obtained.

Since the roller element (roller block) can rotate through 360°, it has lateral guide faces.

The dependent claims contain advantageous developments of the invention.

Claims 9 and 10 define a VTG cartridge according to the invention as an object which can be marketed independently.

Figure 2:
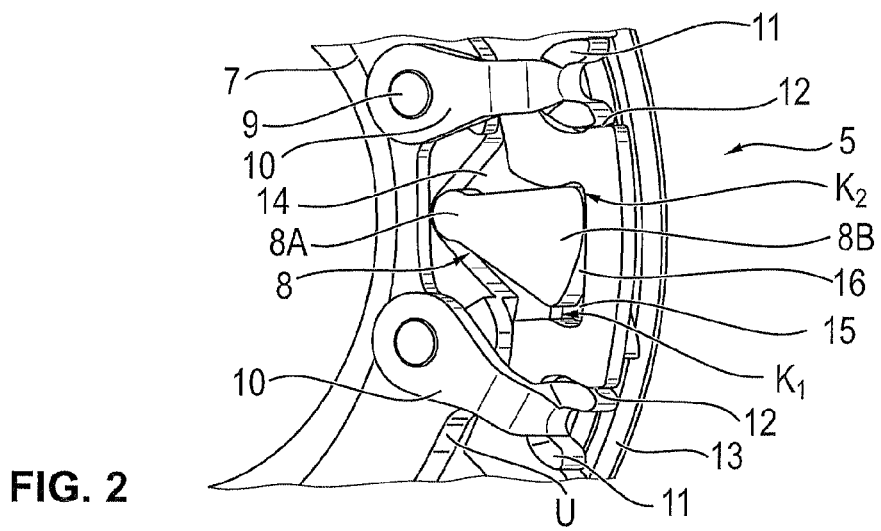
Figure 3:
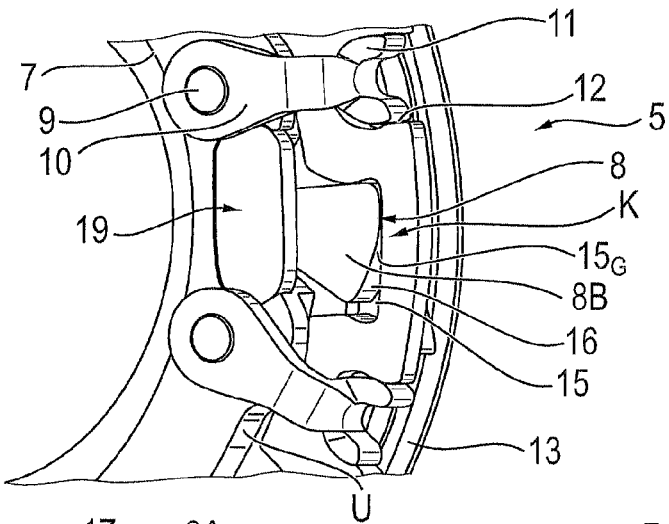
Figure 4:
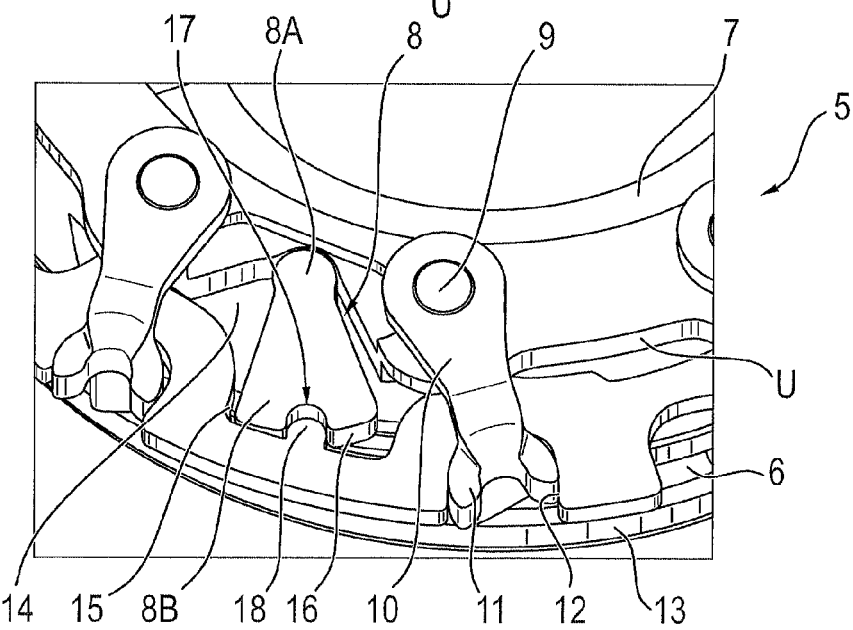

Further details, features and advantages of the invention become apparent from the following description of exemplary embodiments with reference to the drawing, in which:

FIG. 1 shows a schematically greatly simplified illustration of an exhaust-gas turbocharger according to the invention, FIG. 2 shows a perspective partial view of a first embodiment of a VTG cartridge according to the invention, FIG. 3 shows a partial view, corresponding to FIG. 2, of the VTG cartridge shown in FIG. 2 with a mounted covering plate, and FIG. 4 shows a partial illustration, enlarged compared to FIG. 3, of a second embodiment of the VTG cartridge according to the invention.

FIG. 1 shows a schematically greatly simplified basic illustration of an exhaust-gas turbocharger 1 according to the invention, which has a charger axis of rotation L.

The exhaust-gas turbocharger 1 also has a turbine 2, which comprises a turbine wheel 3 surrounded by an intake duct 4, which is provided with a so-called VTG cartridge 5. This VTG cartridge 5 will be described in detail hereinbelow with reference to FIGS. 2 to 4.

The exhaust-gas turbocharger 1 also of course has all the other common parts of an exhaust-gas turbocharger, such as a rotor 20, which is mounted rotatably in a bearing housing 21 and which bears the turbine wheel 3 at one end and a compressor wheel 23 of a compressor 22 at the other end. These parts are likewise shown only in schematically greatly simplified form in FIG. 1, since they are not of importance for explaining the principles of the present invention.

The VTG cartridge, which, as mentioned, will be explained in detail hereinbelow with reference to FIGS. 2 to 4, is likewise shown in greatly schematically simplified form.

A VTG cartridge is understood to mean a structural unit which, between a vane bearing ring 7 and a disk 6, delimits the intake duct 4 for the passage of exhaust gases to the turbine wheel 3. Furthermore, such a VTG cartridge has a plurality of vanes, which are arranged in the intake duct 4 but cannot be seen in FIGS. 2 to 4. The vanes can be moved rotatably in the vane bearing ring 7 between a closed and an open position. For this purpose, the vanes have vane shafts 9 each having an axis of rotation. The vane shafts 9 in turn are connected to vane levers 10, of which two vane levers are denoted in each case in FIG. 2 with the reference numeral 10. In the case of a VTG cartridge 5, it is possible, for example, for ten such vane levers which are each formed identically and are preferably offset to be provided.

Each vane lever 10 has a lever head 11, which engages into an associated groove 12 in a unison ring 13. FIG. 2 shows in this respect that the unison ring 13 surrounds the vane bearing ring 7 on the outside, i.e. along the outer circumference thereof.

For radially mounting the unison ring 13, provision is made of a radial bearing, which according to the invention is formed by at least one roller element 8.

In the first embodiment shown in FIGS. 2 and 3, the roller element 8 has a first supporting region 8A, which is inserted into a depression 14 in the vane bearing ring 7 which is arranged circumferentially and is open to the outer circumference U of the vane bearing ring 7. Furthermore, FIGS. 2 and 3 show that the roller element 8 has a second supporting region 8B, which engages into a bearing groove 15 which is arranged opposite the depression 14, is arranged in the unison ring 13 and is open on one side in the direction toward the depression 14.

FIG. 2 shows that the roller element 8, which can also be referred to as a roller block, has a triangular configuration. In this case, the first supporting region 8A has a semicircularly rounded form, which merges into the second supporting region 8B in an outwardly conically widening manner. This supporting region 8B has in turn a rounded end face 16, which rolls on an opposing face $15_G$ of the bearing groove 15, a contact point K for rolling bearing between the unison ring 13 and the roller element 8 being denoted in FIG. 3 by the arrow present there. The opposing face $15_G$ may in this case have a planar form or likewise have a slightly rounded form.

FIG. 3 shows that a covering plate 19 is inserted into the depression 14 and fixed there for axially securing the roller element 8. This covering plate 19 is not shown in FIG. 2, in order to make it possible for the overall configuration of the roller element 8 to be shown.

FIG. 4 shows an alternative embodiment, in which all the features which correspond to the embodiment shown in FIGS. 2 and 3 are provided with the same reference signs.

In this embodiment, too, provision is made of a roller element (roller block 8) which, in turn, has a semicircularly rounded, first supporting region 8A, which engages into the depression 14 in the vane bearing ring 7 which is open on one side.

This roller block 8, too, has a second supporting region 8B which engages into the bearing groove 15. In this embodiment, however, the second supporting region 8B has a recess 17, into which a driver projection 18 of the unison ring 13 engages, as becomes apparent in detail from the illustrative representation in FIG. 4.

Both embodiments shown in FIGS. 2 and 3 or 4 have the common feature that the roller element 8 is guided freely movably in the depression 14 and the bearing groove 15.

Furthermore, in both embodiments, provision can preferably be made of three, four or five roller elements 8, which can be arranged distributed over the circumference of the VTG cartridge.

In addition to the above written disclosure, reference is hereby explicitly made to the illustrative representation of the invention in FIGS. 1 to 4 to supplement the disclosure of the invention.

LIST OF REFERENCE SIGNS

1 Exhaust-gas turbocharger
2 Turbine
3 Turbine wheel
4 Intake duct
5 VTG cartridge
6 Disk
7 Vane bearing ring
8 Roller element/roller block
8A, 8B Supporting regions
9 Vane shafts
10 Vane lever
11 Lever heads
12 Grooves
13 Unison ring
14 Depression
15 Bearing groove
$15_G$ Opposing wall face
16 End face
17 Recess
18 Driver projection
19 Covering plate
20 Rotor
21 Bearing housing
22 Compressor
23 Compressor wheel
$K_1$ and $K_2$ Lateral contact points for carrying along the roller element 8
K Contact point for rolling bearing
L Charger longitudinal axis

The invention claimed is:

1. An exhaust-gas turbocharger (1) having
a turbine (2),
which has a turbine wheel (3) surrounded by an intake duct (4), and
a VTG cartridge (5),
which has a disk (6) and a vane bearing ring (7), which delimit the intake duct,
which has a plurality of vanes, which are arranged in the intake duct (4) and mounted in the vane bearing ring (7) by way of rotatable vane shafts (9), which are connected to vane levers (10), the lever heads (11) of which engage into associated grooves (12) in a unison ring (13), which surrounds the vane bearing ring (7) on the outside, and
a radial bearing between the unison ring (13) and the vane bearing ring (7), wherein
the radial bearing has at least one roller element (8),
which has a first supporting region (8A), which is inserted into a depression (14) in the vane bearing ring (7) which is arranged circumferentially and is open to the outer circumference (U), and
which has a second supporting region (8B), which engages into a bearing groove (15) which is arranged opposite the depression (14), is provided in the unison ring (13) and is open on one side in the direction toward the depression (14).

2. The exhaust-gas turbocharger as claimed in claim 1, wherein the roller element (8) has a triangle-like configuration.

3. The exhaust-gas turbocharger as claimed in claim 1, wherein the first supporting region (8A) has a semicircularly rounded form.

4. The exhaust-gas turbocharger as claimed in claim 1, wherein the second supporting region (8B) has a rounded end face (16).

5. The exhaust-gas turbocharger as claimed in claim 1, wherein the second supporting region (8B) has a recess (17), into which a driver projection (18) of the unison ring (13) engages.

6. The exhaust-gas turbocharger as claimed in claim 1, wherein a covering plate (19) is inserted into the depression (14) and fixed for axially securing the roller element (8).

7. The exhaust-gas turbocharger as claimed in claim 1, wherein the roller element (8) is guided freely movably in the depression (14) and the bearing groove (15).

8. The exhaust-gas turbocharger as claimed in claim 1, wherein three, four or five roller elements (8) are provided.

9. A VTG cartridge (5) of an exhaust-gas turbocharger (1), having
a disk (6) and a vane bearing ring (7), which delimit an intake duct (4),
a plurality of vanes, which are arranged in the intake duct (4) and mounted in the vane bearing ring (7) by way of rotatable vane shafts (9), which are connected to vane levers (10), the lever heads (11) of which engage into associated grooves (12) in a unison ring (13), which surrounds the vane bearing ring (7) on the outside, and
a radial bearing between the unison ring (13) and the vane bearing ring (7), wherein
the radial bearing has at least one roller element (8),
which has a first supporting region (8A), which is inserted into a depression (14) in the vane bearing ring (7) which is arranged circumferentially and is open toward the outer circumference (U), and
which has a second supporting region (8B), which engages into a bearing groove (15) which is arranged opposite the depression (14), is provided in the unison ring (13) and is open on one side in the direction toward the depression (14).

10. The VTG cartridge as claimed in claim 9, wherein the roller element (8) has a triangle-like configuration.

11. The VTG cartridge as claimed in claim 9, wherein the first supporting region (8A) has a semicircularly rounded form.

12. The VTG cartridge as claimed in claim 9, wherein the second supporting region (8B) has a rounded end face (16).

13. The VTG cartridge as claimed in claim 9, wherein the second supporting region (8B) has a recess (17), into which a driver projection (18) of the unison ring (13) engages.

14. The VTG cartridge as claimed in claim 9, wherein a covering plate (19) is inserted into the depression (14) and fixed for axially securing the roller element (8).

15. The VTG cartridge as claimed in claim 9, wherein the roller element (8) is guided freely movably in the depression (14) and the bearing groove (15).

16. The VTG cartridge as claimed in claim 9, wherein three, four or five roller elements (8) are provided.

* * * * *